US 8,523,268 B2

(12) United States Patent
Kikuchi et al.

(10) Patent No.: US 8,523,268 B2
(45) Date of Patent: Sep. 3, 2013

(54) LUGGAGE SPACE ARRANGEMENT FOR STOWING AWAY A RETRACTABLE TONNEAU COVER ASSEMBLY

(75) Inventors: Hirobumi Kikuchi, Saitama (JP);
Mitsufumi Hashimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 13/142,535

(22) PCT Filed: Dec. 25, 2009

(86) PCT No.: PCT/JP2009/007277
§ 371 (c)(1),
(2), (4) Date: Jun. 28, 2011

(87) PCT Pub. No.: WO2010/079576
PCT Pub. Date: Jul. 15, 2010

(65) Prior Publication Data
US 2011/0266828 A1    Nov. 3, 2011

(30) Foreign Application Priority Data
Jan. 9, 2009  (JP) ................................. 2009-003054

(51) Int. Cl.
*B60J 7/20*  (2006.01)
(52) U.S. Cl.
USPC ............... 296/136.04; 296/136.03; 296/37.8; 296/98
(58) Field of Classification Search
USPC .............. 296/24.33, 24.4, 24.43, 37.16, 37.8, 296/98, 99.1, 100.01, 100.11, 100.15, 100.16, 296/136.03, 136.04, 143; 224/328, 539
See application file for complete search history.

(56) References Cited

U.S. PATENT DOCUMENTS

| 5,632,520 A | 5/1997 | Butz |
| 2008/0179907 A1 * | 7/2008 | Medlar et al. ................ 296/37.1 |

FOREIGN PATENT DOCUMENTS

| DE | 10 2004 060 747 A1 | 7/2006 |
| EP | 1 484 221 A2 | 12/2004 |
| FR | 2 900 611 A1 | 11/2007 |
| JP | 62-082254 U | 5/1987 |

(Continued)

OTHER PUBLICATIONS

Fuji Heavy Industries, Japanese Publication 2000-280828, machine translation retreived via Indutrial Property Digital Libray wesite, http://www.ipdl.inpit.go.jp/homepg_e.ipdl, retreived on Dec. 19, 2012.*

*Primary Examiner* — Glenn Dayoan
*Assistant Examiner* — Jason S Daniels
(74) *Attorney, Agent, or Firm* — Carrier Blackman & Associates, P.C.; Joseph P. Carrier; William D. Blackman

(57) ABSTRACT

Provided is an arrangement for stowing away a retractable tonneau cover assembly (50) under a floor of a luggage space (10) requiring a very small space. A recess (36) is formed laterally across a width of a vehicle body in a rear end thereof. When stowing away the assembly, an outer tube (52) of the assembly is received in the recess with a longitudinal slot (54) thereof facing upward. A flexible cover sheet (56) extends out of the longitudinal slot (54), and a rigid free end member (58) attached to a free end of the flexible cover sheet (56) extends along a rear side of the outer tube into a deep section (36B) of the recess (36). Therefore, the recess (36) is required to have a width which is not significantly greater than the height (h) of the outer tube (52).

10 Claims, 7 Drawing Sheets

(56) References Cited

FOREIGN PATENT DOCUMENTS

| | | |
|---|---|---|
| JP | 10-166949 A | 6/1998 |
| JP | 2000-280828 A | 10/2000 |
| JP | 2006-264627 A | 10/2006 |

* cited by examiner

LUGGAGE SPACE ARRANGEMENT FOR STOWING AWAY A RETRACTABLE TONNEAU COVER ASSEMBLY

TECHNICAL FIELD

The present invention relates to a luggage space structure for a motor vehicle, and in particular to a luggage space structure for use in a rear part of motor vehicles such as hatchback vehicles and wagons.

BACKGROUND OF THE INVENTION

A motor vehicle such as a hatchback vehicle or a wagon has a luggage space located in a rear part of the vehicle body and communicating with the passenger compartment. Such a luggage space is sometimes concealed from view by using a tonneau cover sheet that extends above the luggage space.

A tonneau cover sheet is typically wound around a spool shaft inside an outer tube so that a flexible cover sheet may be paid out and refracted from and onto the spool shaft via a longitudinal slot formed in the outer tube. The free edge or outer edge of the flexible cover sheet is provided with a cover handle that extends out of the slot of the outer tube even when the flexible cover sheet is fully wound around the spool shaft. See Japanese patent application No. 2006-264627 (patent document 1) for such an example.

When in use, the outer tube is typically placed behind the seat back of the rear seat adjacent to the upper end of the seat back, and extends horizontal across both the width and length of the luggage space. Therefore, when the rear seat is configured to be folded forward so as to enlarge the luggage space, the outer tube interferes with such a movement of the seat back of the rear seat.

Therefore, it has been practiced to allow the retractable tonneau cover assembly to be removed from the normal position, and stowed under the floor of the luggage space or an otherwise no-interfering location of the vehicle body when the seat back of the rear seat is to be folded forward so as to enlarge the available luggage space. See Japanese patent application No. 2000-280828 (patent document 2) for such an example.

When the retractable tonneau cover assembly is to be stowed under the floor of the luggage space, the outer tube is required to be received in an as small a recess as possible. Also, the recess may not cause damage to the retractor tube when the vehicle body is subjected to impacts and vibrations, and should allow the outer tube to be taken out and stowed with ease. However, the leading edge or free end of the flexible sheet is typically provided with a rigid free end member having a substantial width and an arcuate edge so as to conform to the inner profile of the tailgate and minimize a gap which is otherwise defined between the free end of the flexible cover sheet and the opposing inner surface of the tailgate. Therefore, the recess for stowing the tonneau cover assembly is required to be large enough not only to accommodate the outer tube but also the free end member extending therefrom. This causes the width (in the longitudinal direction of the vehicle body) of the recess to be undesirably great, and the space under the floor of the luggage space which can be otherwise used for stowing tools and luggage to be undesirably small.

BRIEF SUMMARY OF THE INVENTION

In view of such problems of the prior art, a primary object of the present invention is to provide a luggage space arrangement of a motor vehicle for stowing away a retractable tonneau cover assembly that occupies a minimum space.

A second object of the present invention is to provide a luggage space arrangement that allows a retractable tonneau cover assembly to be stowed away and taken out in a convenient manner.

Such objects of the present invention can be at least partly accomplished by providing a luggage space arrangement of a motor vehicle for stowing away a retractable tonneau cover assembly, the tonneau cover assembly including an outer tube having a longitudinal slot extending along an axial direction thereof, a rotatable winding core received in the outer tube, a flexible sheet wound around the winding core, a spring member resiliently urging the rotatable core in a direction to wind the flexible sheet thereon and a rigid free end member attached to a free end of the flexible sheet and configured to extend out of the longitudinal slot, the arrangement comprising: a recess formed in a floor member of a luggage space so as to extend laterally across a width of a vehicle body and dimensioned to receive the retractable tonneau cover assembly therein; wherein the recess comprises a shallow section formed on either lateral end thereof and a deep section formed in a middle part thereof, and the rigid free end member is allowed to extend vertically into the deep section of the recess when the retractable tonneau cover assembly is received in the recess.

Thereby, even when the rigid free end member has a significant width, the entire retractable tonneau cover assembly can be stowed in a recess which is not significantly larger than the outer profile of the outer tube.

According to a preferred embodiment of the present invention, the longitudinal slot of the outer tube is directed upward, and the rigid free end member extends along a side of the outer tube into the deep section of the recess when the retractable tonneau cover assembly is received in the recess.

According to another embodiment of the present invention, the longitudinal slot of the outer tube is directed sideways, and the rigid free end member extends along a side of the outer tube into the deep section of the recess when the retractable tonneau cover assembly is received in the recess.

According to yet another embodiment of the present invention, the longitudinal slot of the outer tube is directed downward, and the rigid free end member depends downward from the slot into directly into the deep section of the recess when the retractable tonneau cover assembly is received in the recess.

Because the slot is typically provided with a guiding arrangement for the flexible cover sheet, the cross section of the outer tube is slightly more elongated in a direction aligned with the longitudinal slot that in a direction perpendicular thereto. For convenient and stable storage of the outer tube in the recess, it is preferable that the cross section of the outer tube is substantially rectangular.

A luggage space is typically accessed from a rear end of the vehicle. Therefore, the recess is preferably formed laterally across a rear end of the luggage space. It is also preferable to use a lid member that selectively closes an opening of the recess so that the luggage space may provide a flat floor surface in spite of the presence of the recess for receiving the retractable tonneau cover assembly. According to a particularly preferred embodiment of the present invention, the lid member comprises a main lid having a hinge provided in a front edge thereof and configured to close a luggage recess defined in front of the recess for receiving the tonneau cover assembly as well, and a pair of side lids each having a hinge in a front edge thereof located behind a wheel house protruding into the luggage space.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
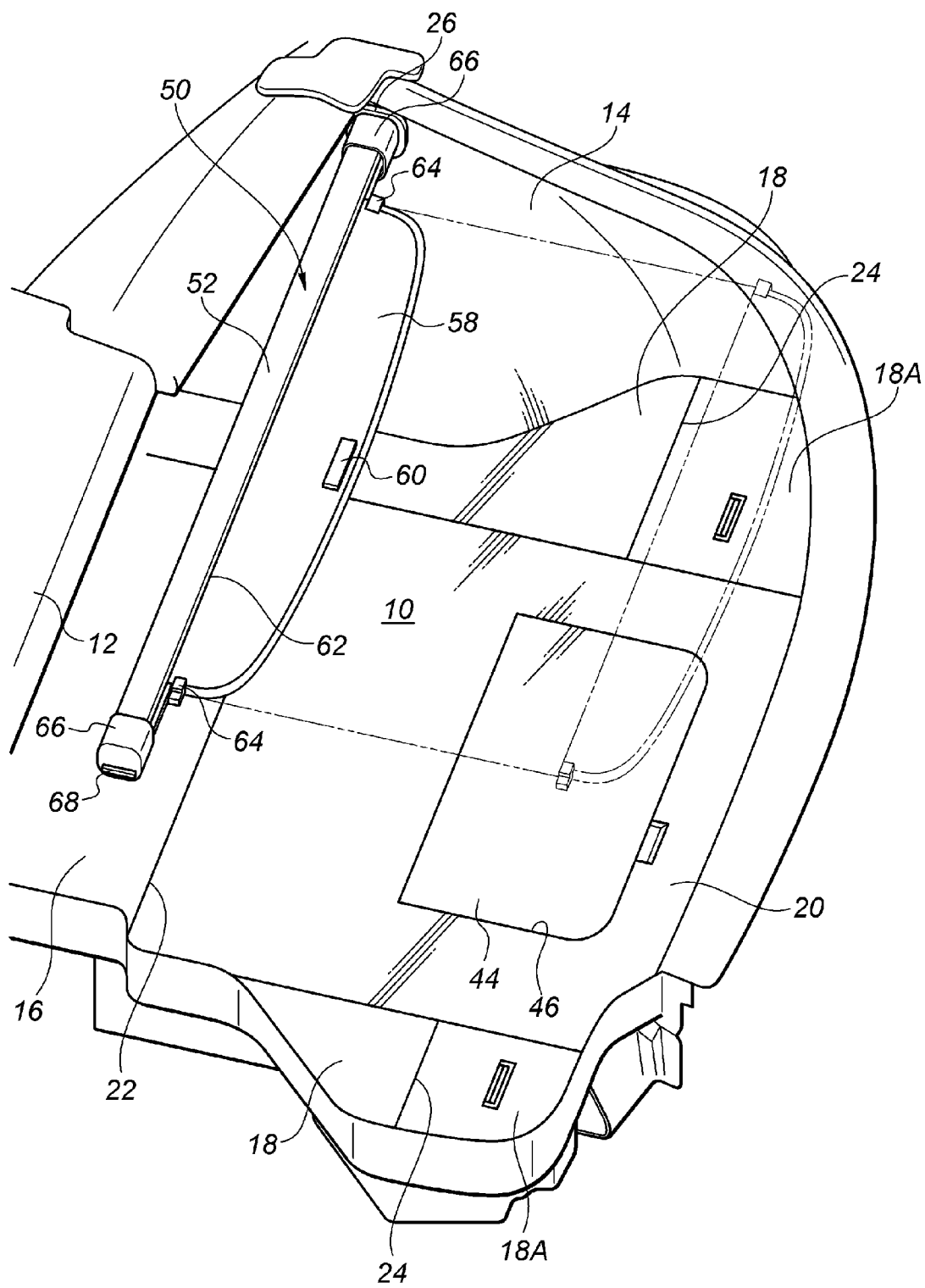
FIG. 1 is a see-through perspective view showing a rear part of a vehicle body embodying the present invention when a retractable tonneau cover assembly is in use.

Referring to FIG. 1, a motor vehicle such as a hatchback vehicle and a station wagon is typically provided with a luggage space 10 in a rear part of a vehicle body thereof. The illustrated luggage space 10 is located behind a rear seat 12, and is defined by a floor, a pair of rear side trims 14 located on either lateral side thereof, a roof panel and a tailgate. A front part of each rear side trim 14 covers a wheel house that protrudes upward from a floor surface. The floor is formed by a fixed front luggage floor panel 16, a pair of side luggage floor panels 18 and a rear luggage floor lid 20.

The rear luggage floor lid 20 comprises a plate member, and accounts for a large part of the floor surface area. The rear luggage floor lid 20 selectively closes a floor storage member 30 (FIG. 2) which will be described hereinafter. The front luggage floor panel 16 extends laterally across the width of the luggage space 10, and has a rear edge adjoining a front edge of the rear luggage floor lid 20. The side luggage floor panels 18 are provided with side edges that adjoin corresponding side edges of the rear luggage floor lid 20 in the closed state.

Figure 2:
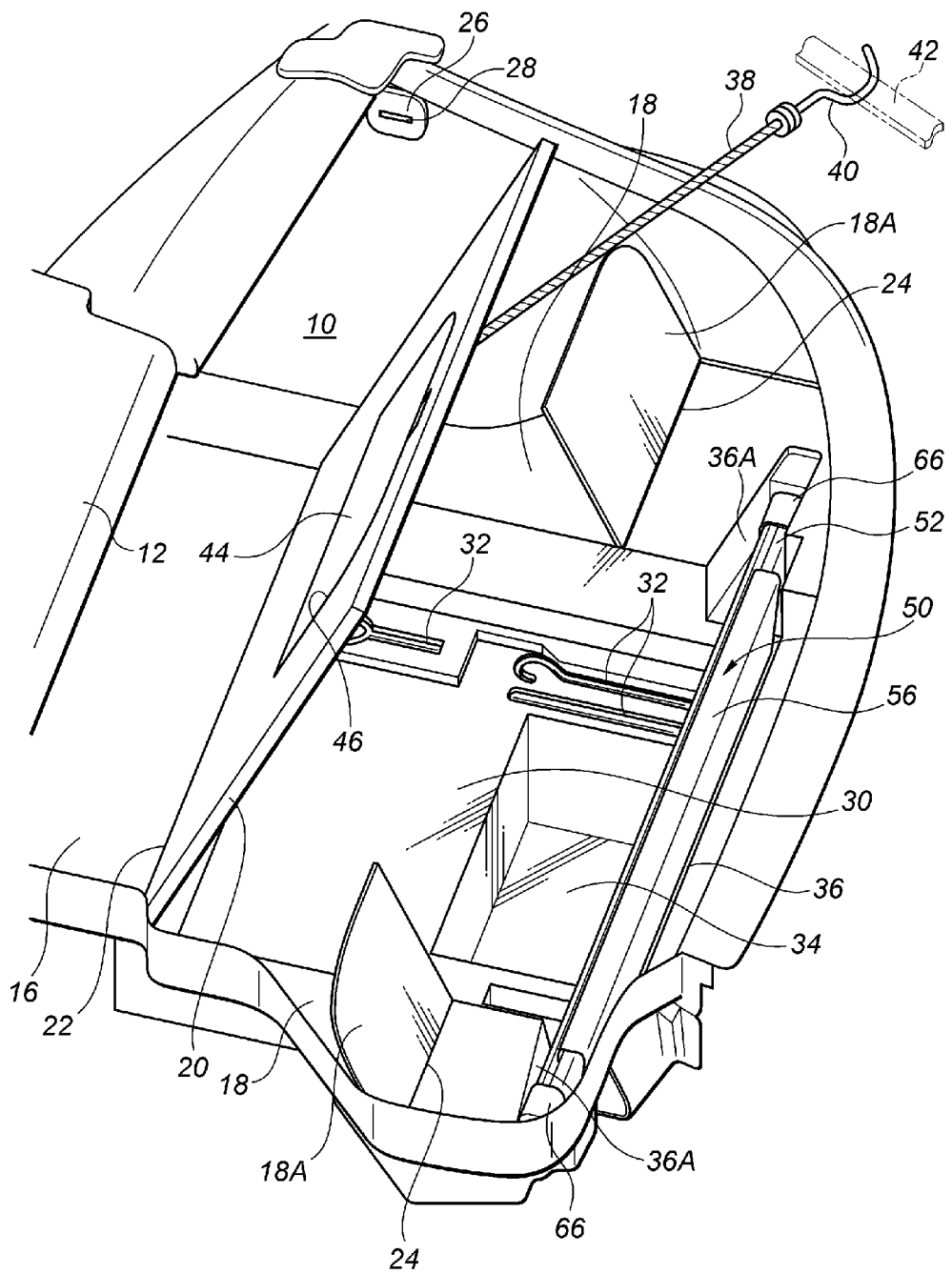
FIG. 2 is a view similar to FIG. 1 when the retractable tonneau cover assembly is stowed away.

The front edge of the rear luggage floor lid 20 is connected to a fixed part of the vehicle body (the rear edge of the front luggage floor panel 16, in the illustrated embodiment) via a hinge 22, and is moveable between a horizontal closed position illustrated in FIG. 1 in which the rear luggage floor lid 20 is flush with the other luggage floor panels 16 and 18 so as to close the floor storage member 30 from view and a raised open position illustrated in FIG. 2 in which the floor storage member 30 is exposed and accessible from outside. Each side luggage floor panel 18 includes a rear extension 18A that can be selectively opened via a hinge 24 located behind the wheel house. The hinge 24 joins the rear extension 18A to the main part of the side luggage floor panel 18.

A pair of tonneau cover retaining members 26 are provided on either side of an upper front part of the luggage space 10 (such as upper parts of the rear side trims 14). A retractable tonneau cover assembly 50 similar in structure to a spring loaded roller screen can be detachably retained by the tonneau cover retaining members 26 in a laterally extending disposition across the width of the luggage space 10.

The structure of the retractable tonneau cover assembly 50 and that of the tonneau cover retaining members 26 are described in the following. The retractable tonneau cover assembly 50 comprises an axially elongated outer tube 52 having an axial length substantially equal to an internal width of the luggage space 10, a winding core 53 rotatably supported in the outer tube 52, a flexible cover sheet 56 (made of vinyl sheet or the like) wrapped around the winding core 53 and having a slightly smaller width than the axial length of the outer tube 52 and a spring member (not shown in the drawings) biasing the winding core in a direction to wind the flexible cover sheet 56 thereon.

An outer end of the flexible cover sheet 56 extends out of an axially extending slot 54 formed in the outer tube 52. A free end of the flexible cover sheet 56 extending out of the slot 54 is incorporated with a free end member 58 comprising a relatively rigid plate member, and fitted with a handle knob 60 for the convenience of pulling the flexible cover sheet 56 out of the outer tube 52 against the spring force of the spring member not shown in the drawing. The leading edge of the free end member 58 is given with an arcuate shape that conforms to the inner profile of the tailgate so that the gap between the leading edge of the free end member 58 and opposing inner surface of the tailgate may be minimized.

Each lateral end of the outer tube 52 is fitted with an engagement piece 66 formed as a cap member which is configured to be resilient depressed in an axial direction against a resilient force of a spring member not shown in the drawing. Each engagement piece 66 is formed with a laterally elongated rib 68 at a free end surface thereof and a complementary slot 28 is formed in the corresponding retaining member 26 so that the rib 68 may be received by the complementary slot 28, and the outer tube 52 may be thereby detachably retained by the retaining members 26. Once thus retained, the retractable tonneau cover assembly 50 extends horizontally across the width of the luggage space 10 in an upper front part of the luggage space 10 a detachable manner as illustrated in FIG. 1.

Figure 3:
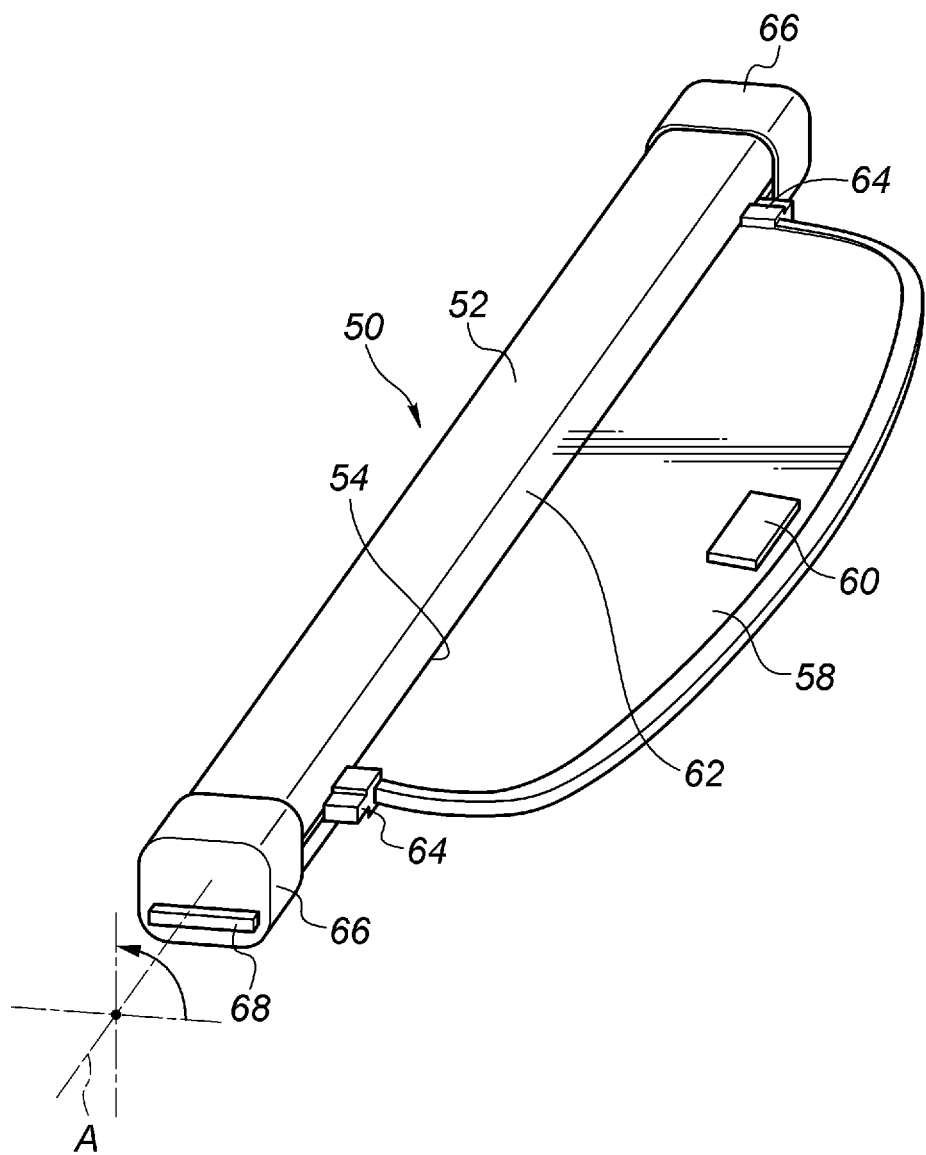
FIG. 3 is a perspective view of the retractable tonneau cover assembly in the state illustrated in FIG. 1.

A pair of stopper members 64 are attached to either lateral end of the free end member 58 adjacent to the main part of the flexible cover sheet 56. The stopper members 64 extend beyond the lateral edges of the flexible cover sheet 56 (lateral ends of the longitudinal slot 54), and configured to engage the outer wall of the outer tube 52 to define the fully retracted state of the flexible cover sheet 56 as best illustrated in FIG. 3. Thus, when the flexible cover sheet 56 is fully retracted, the free end member 58 still extends out of the slot 54 of the outer tube 52. For more detail of the retractable tonneau cover assembly 50, reference may be made to patent document 1.

When using the retractable tonneau cover assembly 50 retained by the retaining members 26, by holding the handle knob 60 of the free end member 58, the flexible cover sheet 56 can be pulled horizontally rearward as illustrated by imaginary lines in FIG. 1 until the stopper members 64 are engaged by engagement portions (not shown in the drawings) formed on either side of an opening of the tailgate. Thereby, the flexible cover sheet 56 extends horizontally over the entire width and longitudinal length of the luggage space 10 at a height corresponding to the upper edge of the seat back of the rear seat 12 so that the contents of the luggage space 10 can be concealed from view. The free end member 58 extends rearward beyond the stopper members 64, and fill a gap that may be otherwise produced between the free end of the flexible cover sheet 56 and opposing surface of the tailgate when the tailgate is closed.

The floor storage member 30 is provided under the floor of the luggage space 10, and defines a plurality of tool storage recesses 32, a luggage storage recess 34 having an open top and a tonneau cover storage recess 36 on a top surface thereof. The tonneau cover storage recess 36 is formed in a rear most part of the luggage space 10 for storing the retractable tonneau cover assembly 50 when not in use. The luggage storage recess 34 is a relatively large box shaped receptacle located immediately ahead of the tonneau cover storage recess 36 for storing other types of luggage or cargo.

The tonneau cover storage recess 36 is formed as a slot extending laterally across the vehicle body, and includes a pair of shallow end sections 36A formed in either lateral end thereof for receiving the corresponding lateral ends of the outer tube 52 and a deep middle section 36B for receiving the free end member 58 of the flexible cover sheet 56 as well as the middle part of the outer tube 52. Each shallow end section 36A is normally closed by the corresponding lid 18A, and the deep middle section 36B is normally closed by the luggage floor lid 20.

When stowing away the retractable tonneau cover assembly 50, the assembly in the fully retracted state is removed from the tonneau cover retaining members 26, and the luggage floor lid 20 is swung open upward around the hinge 20 as illustrated in FIG. 2. This open position of the luggage floor lid 20 can be maintained by pulling out a wire 38 having a base end attached to back side of the luggage floor lid 20, and engaging a hook 40 attached to a free end of the wire 38 with a flange 42 formed in the tailgate which is in open state at such a time. The two side lids 18A are also swung open upward around the corresponding hinges 24, and kept in the open state illustrated in FIG. 2.

The slot 54 faces rearward when the retractable tonneau cover assembly 50 is in use as illustrated in FIG. 3. The retractable tonneau cover assembly 50 is removed from the retaining members 26, and is then turned by 90 degrees (in counter clockwise direction in FIG. 3) around the axial line A of the outer tube 52 from the service state illustrated in FIG. 3 to the stowed state illustrated in FIG. 4 where the slot 54 faces upward. The flexible cover sheet 56 is slightly pulled out, and the free end member 58 is allowed to extend vertically downward along the backside of the outer tube 52.

Figure 4:
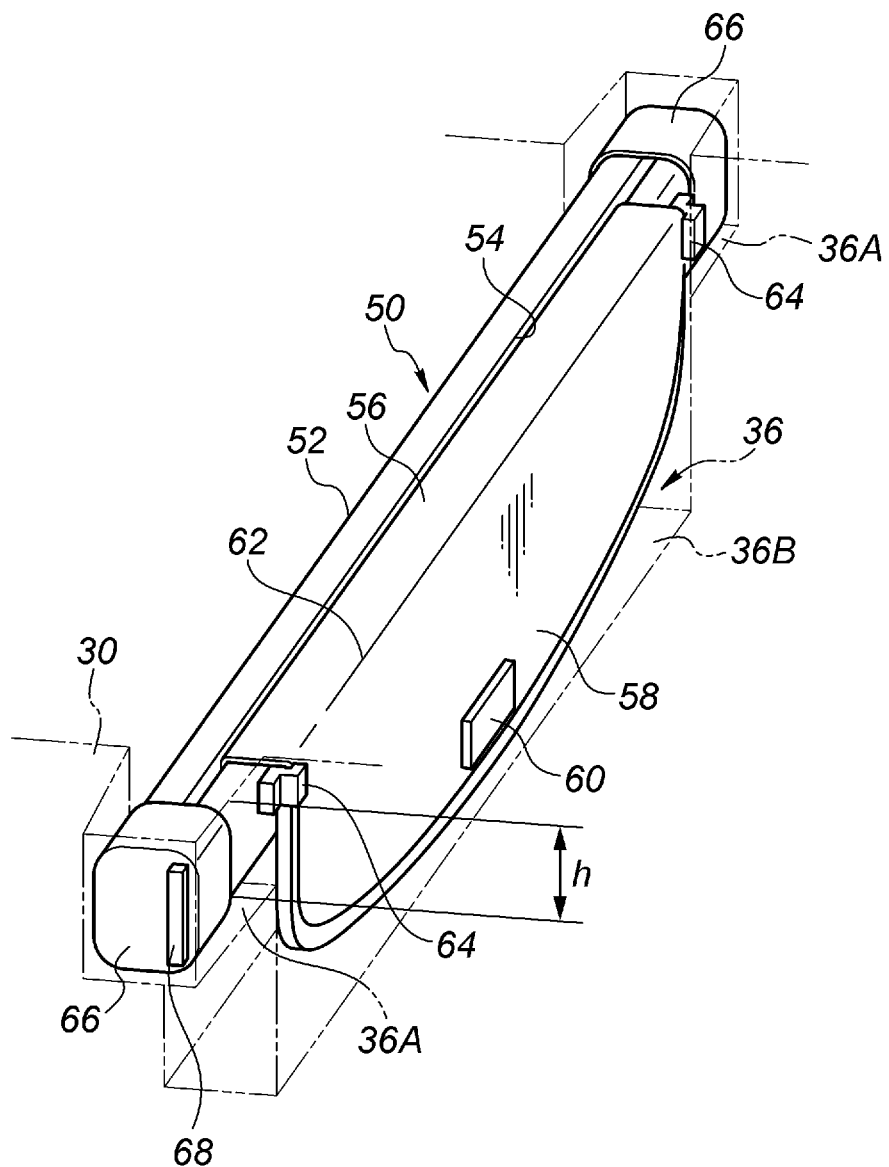
FIG. 4 is a perspective view of the retractable tonneau cover assembly in the state illustrated in FIG. 2.
Figure 5:
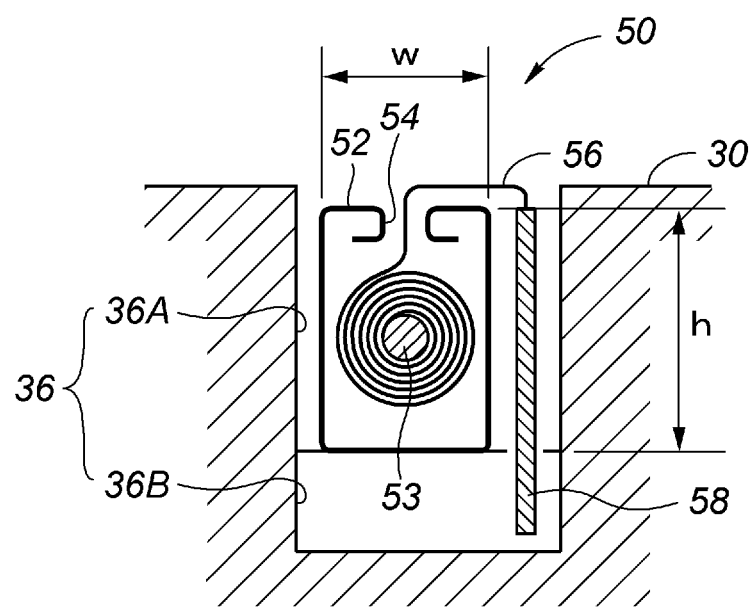
FIG. 5 is a simplified cross sectional view of the retractable tonneau cover assembly in the state illustrated in FIG. 1.

While held horizontally across the vehicle body, the retractable tonneau cover assembly 50 is placed into the tonneau cover storage recess 36 as illustrated in FIGS. 2 and 4. As a result, the two lateral ends of the outer tube 52 are supported by the shallow end sections 36A of the tonneau cover storage recess 36, and the free end member 58 depends freely from the outer tube 52 and drops into the deep middle section 36B of the tonneau cover storage recess 36.

Once the retractable tonneau cover assembly 50 is received in the tonneau cover storage recess 36, the hook 40 is disengaged so as to put the luggage floor lid 20 to the initial closed state, and the two side lids 18A are also closed. This concludes the stowing of the retractable tonneau cover assembly 50.

In the illustrated embodiment, the outer tube 52 has a rectangular cross section, and has a height (h) thereof (as measured in the direction aligning with the longitudinal slot 54) which is slightly greater than a width (w) thereof (as measured in the direction perpendicular to the direction aligning with the longitudinal slot 54). According to the illustrated embodiment, the recess is required to have a width which is only slightly greater than the width (w) of the outer tube 52. The deep middle section 36B is required to have a depth which is only slightly greater than the maximum width of the free end member 58.

Because the free end member 58 of the flexible cover sheet 56 is allowed to freely depend from the outer tube 52 and to drop into the deep middle section 36B of the tonneau cover storage recess 36, the retractable tonneau cover assembly 50 is protected from damages that could be otherwise caused by the vibration of the vehicle in motion. Also, because the two lateral ends of the outer tube 52 is snugly received by the shallow sections 36A, the retractable tonneau cover assembly 50 is prevented from rattling due to the vibrations of the vehicle in motion.

The tonneau cover storage recess 36 is located under the floor in a rearmost part of the luggage space 34, and the luggage storage recess 34 is located ahead of the tonneau cover storage recess 36, taking and putting the retractable tonneau cover assembly 50 out of and into the tonneau cover storage recess 36 can be performed in an efficient manner from a rear part of the vehicle. Also, the luggage storage recess 34 can be accessed in an efficient manner without being hindered by the stowed retractable tonneau cover assembly 50.

In the illustrated embodiment, the luggage floor lid 20 is provided with a small hatch 46 that can be closed and opened by a small lid 44 so that luggage or other small articles may be taken out and put into the luggage storage recess 34 even when the luggage floor lid 20 is closed.

Also, because the luggage floor lid 20 is connected to the vehicle body at the front edge thereof via the hinge 22, the luggage floor lid 20 can be handled from the rear part of the vehicle in a convenient manner.

In the illustrated embodiment, the width of the free end member 58 was greater than the height (h) of the outer tube 52 when the assembly is received in the tonneau cover recess 36 so that the tonneau cover recess 36 (or the deep section thereof 36B) was required to be at least as deep as the width of the free end member 58. However, the width of the free end member 58 may be smaller than the height (h) of the outer tube 52 when the assembly is received in the tonneau cover recess 36 without departing from the spirit of the present invention. In such a case, the tonneau cover recess 36 would be required to be at least as deep as the height (h) of the outer tube 52.

Figure 6:
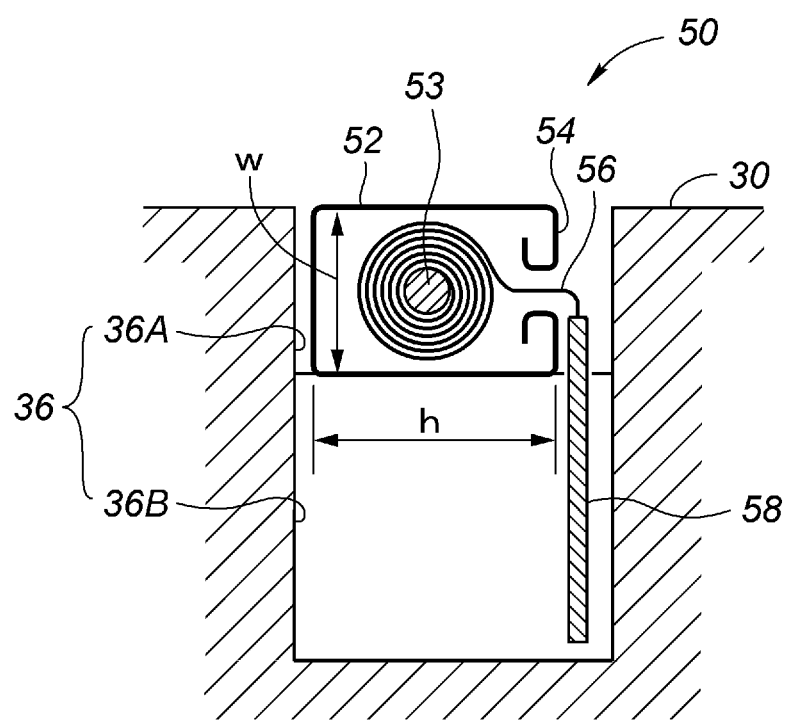
FIG. 6 is a view similar to FIG. 5 showing a second embodiment of the present invention.

FIG. 6 shows a second embodiment of the present invention. The retractable tonneau cover assembly 50 is stowed in the tonneau cover storage recess 36 with the slot 54 facing rearward, and the free end member 58 depends from the slot 54, and extends along the rear side of the outer tube 52. In this embodiment, the width of the tonneau cover recess 36 is required to be as great as a sum of the height (h) of the outer tube 52 and the thickness of the free end member 58. If the flexible cover sheet 56 is slightly extended until the free end member 58 drops clear of the outer tube 52, the width of the tonneau cover recess 36 is required to be only as great as the height (h) of the outer tube 5 although the deep section thereof 36B of the tonneau cover recess 36 is required to be slightly greater than the width of the free end member 58.

Figure 7:
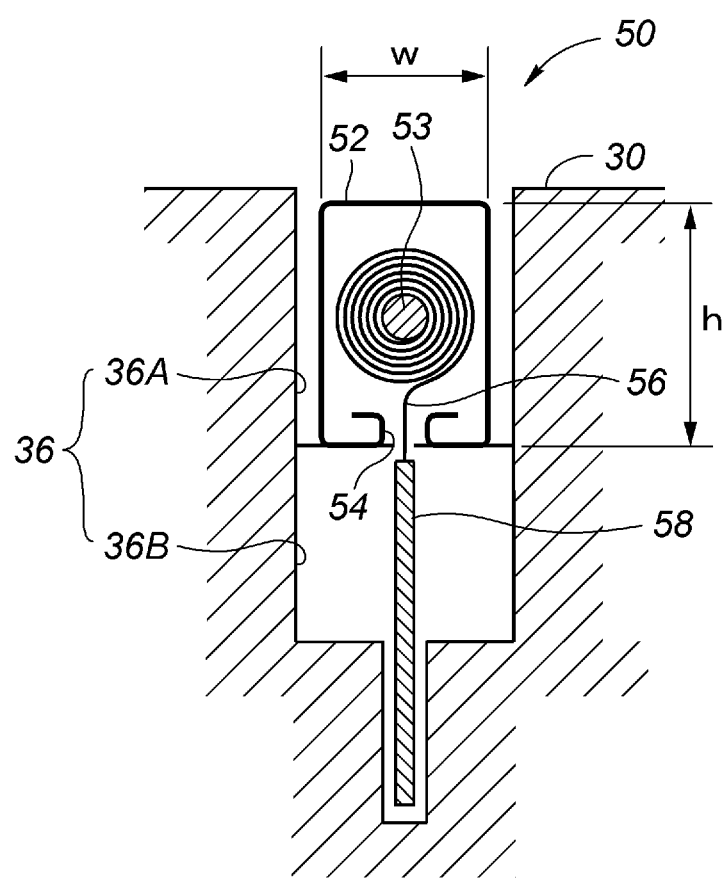
FIG. 7 is a view similar to FIG. 5 showing a third embodiment of the present invention.

FIG. 7 shows a third embodiment of the present invention. The retractable tonneau cover assembly 50 is stowed in the tonneau cover storage recess 36 with the slot 54 facing downward, and the free end member 58 depends from the slot 54 directly into the deep section thereof 36B of the tonneau cover recess 36. In this embodiment, the width of the tonneau cover recess 36 is required to be only as great as the width (w) of the outer tube 52 but the deep section thereof 36B of the tonneau cover recess 36 is required to be as great as a sum of the height (h) of the outer tube 5 and width of the free end member 58.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application as well as those of any prior art references mentioned in this application are incorporated in this application by reference.

| GLOSSARY | |
|---|---|
| 10 luggage space | 20 luggage floor lid |
| 26 tonneau cover retaining member | 30 floor storage member |
| 34 luggage storage recess | 36 tonneau cover storage recess |
| 50 retractable tonneau cover assembly | |
| 54 slot | 56 flexible cover sheet |
| 58 free end member | 60 stopper member |
| 66 engagement piece | |

The invention claimed is:

1. A luggage space arrangement of a motor vehicle for stowing away a retractable tonneau cover assembly, the tonneau cover assembly including an outer tube having a longitudinal slot extending along an axial direction thereof, a rotatable winding core received in the outer tube, a flexible sheet wound around the winding core, a spring member resiliently urging the rotatable core in a direction to wind the flexible sheet thereon and a rigid free end member attached to a free end of the flexible sheet and configured to extend out of the longitudinal slot, the arrangement comprising:

a recess formed in a floor member of a luggage space so as to extend laterally across a width of a vehicle body and dimensioned to securely receive the retractable tonneau cover assembly therein, the recess configured to retain the tonneau cover assembly therein in a manner such that the tonneau cover assembly is substantially restricted from moving therein during movement of the vehicle; and wherein the recess comprises shallow sections formed on lateral ends thereof and a deep section formed in a middle part thereof, the shallow sections of the recess are configured and arranged such that lateral ends of the tonneau cover assembly are snugly received therebetween in a stored configuration thereof, and wherein the deep section is configured to allow the rigid free end member to extend vertically into the deep section of the recess when the retractable tonneau cover assembly is received in the recess.

2. The luggage space arrangement according to claim 1, wherein the longitudinal slot of the outer tube is directed upward, and the rigid free end member extends along a side of the outer tube into the deep section of the recess when the retractable tonneau cover assembly is received in the recess.

3. The luggage space arrangement according to claim 1, wherein the longitudinal slot of the outer tube is directed sideways, and the rigid free end member extends along a side of the outer tube into the deep section of the recess when the retractable tonneau cover assembly is received in the recess.

4. The luggage space arrangement according to claim 1, wherein the longitudinal slot of the outer tube is directed downward, and the rigid free end member depends downward from the slot directly into the deep section of the recess when the retractable tonneau cover assembly is received in the recess.

5. The luggage space arrangement according to claim 1, wherein a cross section of the outer tube is slightly more elongated in a direction aligned with the longitudinal slot that in a direction perpendicular thereto.

6. The luggage space arrangement according to claim 5, wherein the cross section of the outer tube is substantially rectangular.

7. The luggage space arrangement according to claim 1, wherein the first recess is formed laterally across a rear end of the luggage space.

8. The luggage space arrangement according to claim 1, further comprising a lid member that selectively closes an opening of the recess.

9. The luggage space arrangement according to claim 8, wherein the lid member comprises a main lid having a hinge provided in a front edge thereof and configured to close the deep section of the recess, and a pair of side lids each having a hinge in a front edge thereof located behind a wheel house protruding into the luggage space and configured to close the shallow sections of the recess.

10. The luggage space arrangement according to claim 1, wherein the deep section of the recess is configured to receive the rigid free end member directly beneath the outer tube, and the shallow sections of the recess have a width in a longitudinal direction of the vehicle which is slightly greater than a width of the outer tube in the longitudinal direction of the vehicle when the retractable tonneau cover assembly is stored in the recess.

* * * * *